United States Patent
Bar-Ness et al.

(10) Patent No.: US 8,379,746 B2
(45) Date of Patent: Feb. 19, 2013

(54) TRANSMISSION OF ORTHOGONAL SPACE TIME CODES

(76) Inventors: Yeheskel Bar-Ness, Marlboro, NJ (US); Amir Laufer, Highland Park, NJ (US)

(*) Notice: Subject to any disclaimer, the term of this patent is extended or adjusted under 35 U.S.C. 154(b) by 977 days.

(21) Appl. No.: 12/365,800

(22) Filed: Feb. 4, 2009

(65) Prior Publication Data
US 2010/0195750 A1  Aug. 5, 2010

(51) Int. Cl.
*H04B 7/02* (2006.01)
(52) U.S. Cl. ........ 375/267; 375/299; 375/347; 375/349; 455/101; 455/103; 455/105; 455/115.1; 455/115.4
(58) Field of Classification Search .......... 375/267, 375/299, 347, 349; 455/101, 103, 105, 115.1–115.4
See application file for complete search history.

(56) References Cited

U.S. PATENT DOCUMENTS

2008/0253478 A1* 10/2008 Kim et al. .............. 375/299
2009/0202015 A1*  8/2009 Kwon et al. ............ 375/267

OTHER PUBLICATIONS

Jain et al. "On converting OSTC scheme from non-full rate to full-rate with better error performance"; IEEE, Dec. 2008; pp. 230-235.*
Alamouti, S.M., A simple transmitter diversity technique for wireless communications, IEEE J. Select. Areas Commun., vol. 16, pp. 1451-1458, Oct. 1998.
Badic, B. et al, Quasi-orthogonal space-time block codes for data transmission over four and eight transmit antennas with very low feedback rate, in 5th International ITG Conference on Source and Channel Coding (SCC), Jan. 2004, pp. 157-164, Erlangen-Nurnberg.
Jafarkhani, H., A quasi orthogonal space-time block code, IEEE Trans. Commun., vol. 49, pp. 1-4, 2001.
Lu, K. et al, Closed form design of complex orthogonal space-time block codes of rates (k+1)/2k for 2k-1 and 2k transmit antennas, in Proceedings of the Int. Symp. Information Theory (ISIT 2004), Jun./Jul. 2004, p. 307.
Tarokh, V. et al, Space-time block codes from orthogonal designs, IEEE Trans. Inform. Theory, vol. 45, pp. 1456-1467, Jul. 1999.

* cited by examiner

*Primary Examiner* — David Ometz
*Assistant Examiner* — Rahel Guarino (57) ABSTRACT

Implementations of improved transmission of orthogonal space time codes are disclosed.

28 Claims, 5 Drawing Sheets

400 A computer program product.

402 A signal bearing medium.

404 at least one of one or more instructions for providing an Orthogonal Space Time Code (OSTC) codeword;

one or more instructions for selecting at least one row of an OSTC codeword;

one or more instructions for transmitting a partial version of an OSTC codeword;

one or more instructions for designating at least one time slot as a time slot that will not be transmitted;

one or more instructions for receiving an indication of a selected transmission channel;

one or more instructions for selecting at least one row of an OSTC codeword in response to an indication of a selected transmission channel; or one or more instructions for selecting a time slot having a null value in the selected column of an OSTC codeword.

| 406 a computer-readable medium. | 408 a recordable medium. | 410 a communications medium. |

TRANSMISSION OF ORTHOGONAL SPACE TIME CODES

BACKGROUND

Orthogonal Space Time Codes (OSTC) are commonly used in both Multiple Input Multiple Output (MIMO) and Multiple Input Single Output (MISO) communication schemes. In MIMO or MISO systems, the orthogonality of OSTC codes permits full diversity along with relatively simple decoding at the receiver. While OSTC codes exhibit orthogonality for any number of transmitting antennas, the code rate, that is, the ratio between the number of symbols transmitted in each codeword and the number of time slots needed to complete the codeword transmission, decreases as a function of increasing numbers of transmit antennas.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

This disclosure is drawn, inter alia, to methods, apparatus, and systems related to the improved transmission of orthogonal space time codes.

In accordance with the present disclosure when an OSTC codeword is transmitted, one part of an OSTC codeword may be transmitted while another part of the OSTC codeword may be intentionally withheld from transmission. In other words, in some implementations, only a partial version of an OSTC codeword may be transmitted where that partial version excludes selected rows or time slots of the OSTC codeword. Hence, in accordance with the present disclosure, a partial OSTC codeword conveying data symbols may be transmitted using fewer time slots than may be used to transmit the entire OSTC codeword. Further, in some implementations, in accordance with the present disclosure, information regarding one or more selected transmission channels may be used to determine which row (or rows) of an OSTC codeword to withhold from transmission.

As used herein the term Orthogonal Space Time Codes (OSTC) coding refers to any wireless coding scheme in which spatial coding is achieved by the use of multiple transmitting units, such as antennas, corresponding to different transmission channels or frequencies, and temporal coding is achieved by using multiple time intervals or time slots to transmit data symbols. In addition, as used herein the term Multiple Input Multiple Output (MIMO) refers to any type of wireless communications system that employs multiple transmitting antennas and multiple receiving antennas, while the term Multiple Input Single Output (MISO) refers to any communications system that employs multiple transmitting antennas in combination with a single receiving antenna. For example, although claimed subject matter is not limited in this regard, a MIMO system may include a wireless base station employing multiple transmitting antennas in communication with wireless devices such as cell phones, lap top computers, etc., that employ multiple receiving antennas. Also, while claimed subject matter is not limited in this regard, a MISO system may include a wireless base station employing multiple transmitting units such as antennas in communication with wireless devices such as cell phones, lap top computers, etc., that employ single receiving antennas.

Further, as used herein, a collection of OSTCs may be represented by a codeword that specifies which portions of coded data are to be transmitted by which antenna during which time slot. Moreover, as used herein, the term "OSTC codeword" refers to any collection of data used to represent the temporal and spatial characteristics of data symbols that are to be transmitted by multiple antennas over multiple time slots where each antenna, at each time slot, transmits a linear combination of the symbols and/or conjugates of the symbols. Thus, for example, although claimed subject matter is not limited to particular codeword representations, an OSTC codeword may be represented as a matrix where each row of the matrix corresponds to a different time slot, each column of the matrix corresponds to a different transmitting antenna, and each entry of the matrix corresponds to a linear combination of symbols and/or conjugates of symbols. Further, one or more transmit antennas may be inactive during some time slots. Thus, during a given time slot an OSTC codeword may include a corresponding zero or null entry in the codeword to specify that a particular antenna is to not transmit a symbol during that time slot.

An OSTC codeword may be represented in matrix form as follows:

$$X = \begin{pmatrix} x_{11} & \cdots & x_{1N} \\ \vdots & \ddots & \vdots \\ x_{T1} & \cdots & x_{TN} \end{pmatrix} \quad \text{(eq. 1)}$$

where the $X_{TN}$ entries correspond to data symbols transmitted by the $N^{th}$ antenna during the $T^{th}$ time slot. The channel output in such a system may be given by:

$$y = Xh + n \quad \text{(eq. 2)}$$

where y and n correspond to vectors of length T and represent the channel outputs and the system noise, respectively, and h corresponds to a vector of length N and represents the channel coefficients.

For example, in a system having four radio frequency (RF) transmitters with four corresponding antennas transmitting three symbols, an OSTC codeword may be represented by the following example matrix:

$$\begin{pmatrix} s_1 & s_2 & s_3 & 0 \\ -s_2^* & s_1^* & 0 & s_3 \\ -s_3^* & 0 & s_1^* & -s_2 \\ 0 & -s_3^* & s_2^* & s_1 \end{pmatrix} \quad \text{(eq. 3)}$$

where it may be seen that, in addition to k=3 symbols $S_k$, or conjugates of such symbols $S_k^*$, each row or time slot includes a zero or null value. Thus, for any given antenna (or column), there is one row (or time slot), where that antenna does not transmit a data symbol value. In some implementations, as noted above, an indication may be provided to a transmitting system or device that one or more channels has been selected. For example, a wireless device that is to receive OSTC codewords may provide an indication to a transmitting system or device that one or more channels have preference over other channels based on channel state information available at the receiving device such as received signal strength of a channel, signal to noise ratio, etc. In some examples, a preferred channel may be selected to have a stronger received signal and/or a larger signal to noise ratio.

Thus, for example, a wireless device that is to receive an OSTC codeword corresponding to (eq. 3) may indicate that the first channel, corresponding to the first column of (eq. 3), is a preferred channel. In the example of (eq. 3), where there are four transmitting antennas, each associated with a separate one of four channels, a receiving device may provide a two bit signal specifying that one of the four transmit antennas is associated with a selected or preferred channel. Hence, if the wireless device that is going to receive the OSTC codeword corresponding to (eq. 3) has indicated that the first channel is preferred, then the transmitting wireless device may select to withhold from transmission the time slot corresponding to row four of (eq. 3) because the codeword indicates a null value for the selected channel during that time slot.

Figure 1:
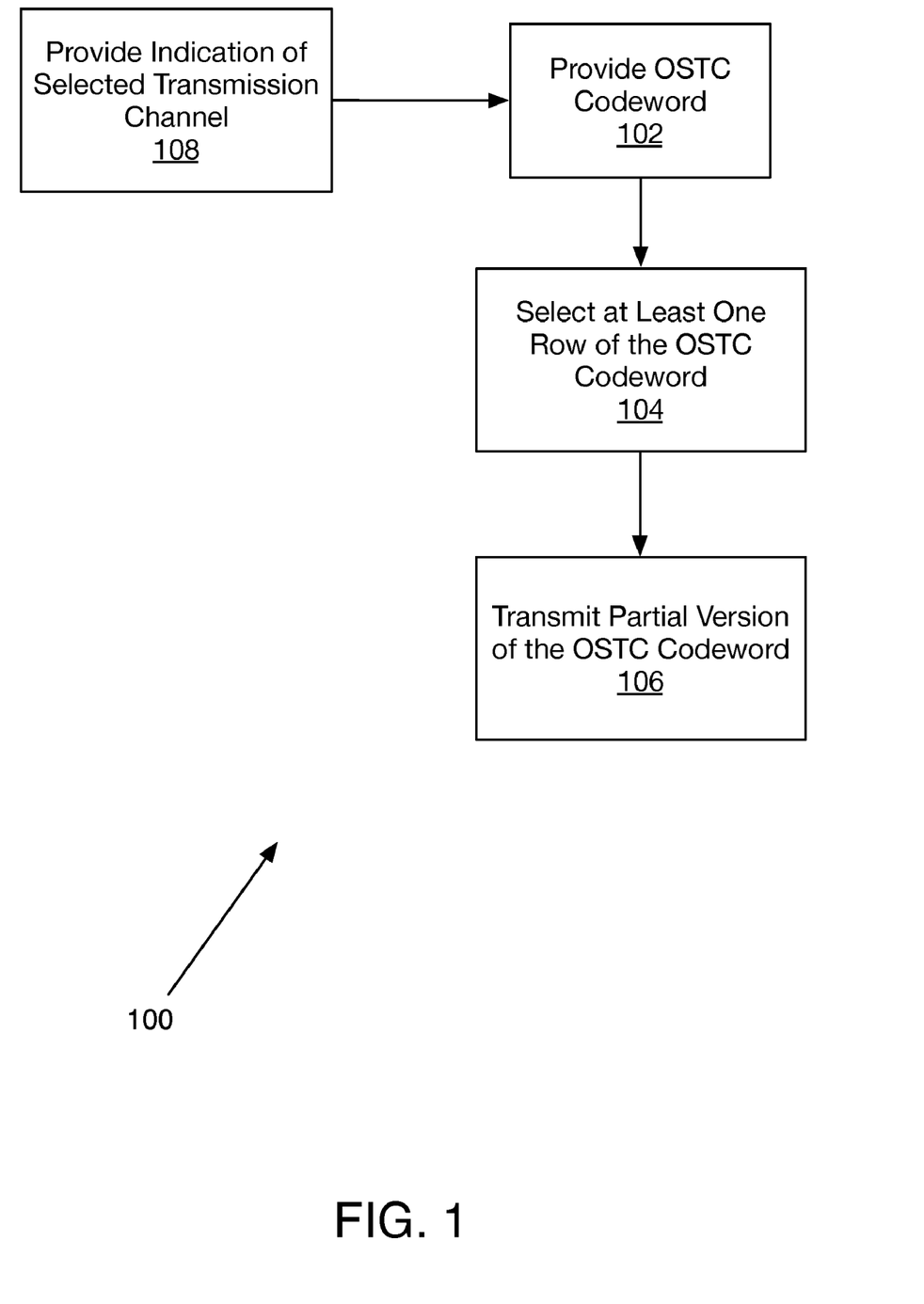
FIG. 1 is a flow chart illustrating an example process for improved transmission of orthogonal space time codes.

FIG. 1 is a flow chart illustrating an example process 100 for improved transmission of orthogonal space time codes in accordance with the present disclosure. Process 100, and other processes described herein, set forth various functional blocks that may be described as processing steps, functional operations, events and/or acts, etc., and that may be performed by hardware, software or any combination thereof. Those skilled in the art in light of the present disclosure will recognize that numerous alternatives to the functional blocks shown in FIG. 1 may be practiced in various implementations.

Process 100 may include providing an OSTC codeword (block 102). Claimed subject matter is not limited to specific types of OSTCs or to specific sizes of OSTC codewords. In block 104, at least one row of the OSTC codeword may be selected. In some implementations the selection of at least one row of an OSTC codeword in block 104 may include designating which rows (time slots) of the OSTC codeword provided in block 102 will be transmitted and which rows will not be transmitted.

Figure 2:
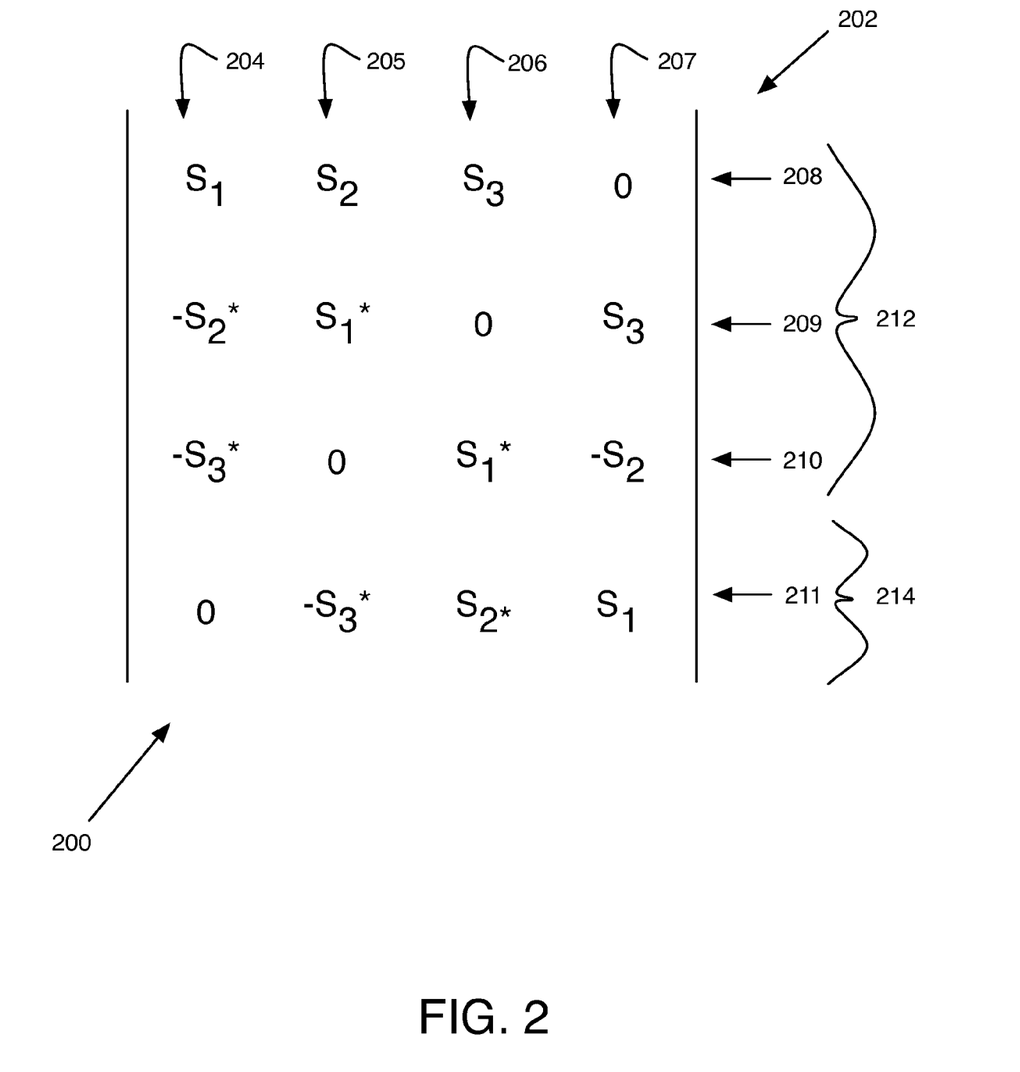
FIG. 2 illustrates an example orthogonal space time code codeword.

For instance, FIG. 2 illustrates an example OSTC codeword 200 for transmission by a wireless device or system having at least four transmitting units or antennas. In this example, where a matrix 202 represents codeword 200, positive or negative values of three symbols $S_1$, $S_2$ and $S_3$ (or their corresponding conjugates $S_1^*$, $S_2^*$ and $S_3^*$) are distributed throughout columns 204-207 and rows 208-211 of matrix 202, where each column represents a different transmission channel and each row represents a different time slot for transmission of symbols. In FIG. 2, each transmission channel corresponds to symbols to be transmitted by a separate antenna of the wireless system. Thus, for example, during a time slot of OSTC codeword 200 corresponding to the first row 208 of matrix 202, an antenna corresponding to column 204 may transmit symbol $S_1$, another antenna corresponding to column 205 may transmit symbol $S_2$ and a third antenna corresponding to column 206 may transmit symbol $S_3$. Further, while the first three antennas may transmit symbols during this first time slot, a fourth antenna corresponding to column 207 may not transmit a symbol in response to the corresponding null value in column 207 of row 208.

Referring again to FIG. 1 in the context of the example of FIG. 2, block 104 may correspond to selecting, for example, row 211 of OSTC codeword 200. Thus, block 104 may result in partitioning codeword 200 into two different portions 212 and 214 corresponding to different time slots. While, in the example of FIG. 2, block 104 may correspond to selecting one time slot or row 211 of codeword 200, claimed subject matter is not limited in this regard, and block 104 may correspond to selecting any number or subset of OSTC codeword rows. Thus, for example, block 104 may also correspond to selecting two or more time slots including any subset of rows of an OSTC codeword.

Process 100 may continue with transmitting a partial version of the OSTC codeword (block 106) where the partial version of the codeword excludes the row(s) selected in block 104. For instance, referring again to the example of FIG. 2, block 106 may correspond to transmitting portion 212 of OSTC codeword 200. Thus, in this example, portion 212 may correspond to a partial version of OSTC codeword 200 that includes rows 208-210 while excluding row 211 corresponding to portion 214. Thus, block 106 includes transmitting a partial version of an OSTC codeword that excludes one or more time slots of the full OSTC codeword. Further, in some implementations, transmitting a partial version of OSTC codeword in block 106 may include never transmitting the row or rows selected in block 104.

Further, in accordance with some implementations, process 100 may include receiving an indication of a selected transmission channel or transmission channels in block 108. For example, a wireless system or device that is to receive an OSTC codeword may provide an indication that one or more transmission channels have preference over other channels based on criteria such as channel strength. Thus, in some implementations, a wireless system or device that may transmit a partial version of an OSTC codeword in block 106 may receive, in block 108, an indication of a selected channel or channels and use that information to select one or more rows or time slots to in block 104.

In some implementations, the row or rows of the OSTC codeword selected in block 104 may correspond to one or more time slots in which the OSTC codeword indicates a null value for the selected channel or channels. For example, referring again to FIG. 2, a receiving device may indicate in block 108 that the channel corresponding to column 204 is selected as preferred. The receiving device may do so by providing a signal that may be received by the transmitting device in block 108. In general such an indication may be in the form of a signal of $\log_2(N)$ bits where N is the number of transmitting channels in a MIMO or MISO system. In the example of FIG. 2 having N=4 transmitters, a receiving device may use a two-bit signal to indicate a selected channel.

As already noted, selection of the row(s) of the OSTC codeword in block 104 may be done in response to the information received in block 108. For example, if the indication received in block 108 specifies that the channel corresponding to column 204 is preferred, then row 211 may be selected in block 104 because that row of codeword 200 indicates a null value in column 204. Hence, in the example of FIG. 2, transmitting a partial version of the OSTC codeword in block 106 may correspond to a transmitting only portion 212 of OSTC codeword 200. Because portion 212 excludes row 211, undertaking block 106 using portion 212 permits symbols of OSTC codeword 200 to be transmitted using fewer time slots than otherwise needed to transmit the full OSTC codeword 200. Although FIG. 1 illustrates block 108 as occurring prior to block 102, claimed subject matter is not limited in this regard and block 108 can occur at any time prior to block 104.

Figure 3:
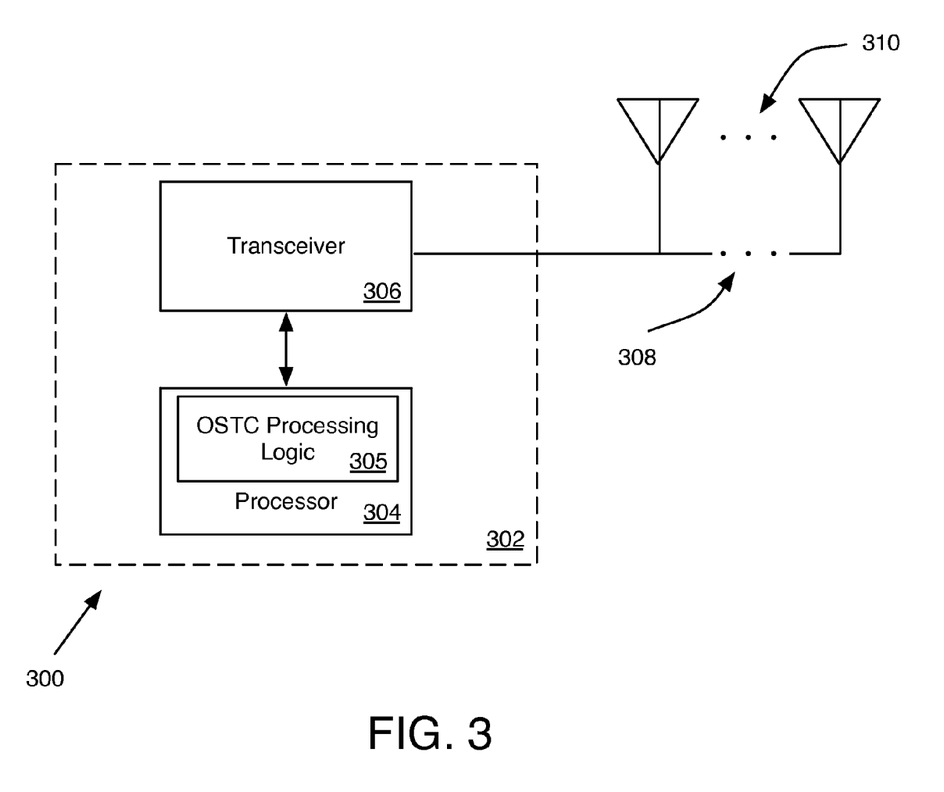
FIG. 3 illustrates an example device for wireless communications.

FIG. 3 illustrates an example device 300 for wireless communications in accordance with the present disclosure. Device 300 may be used to perform some or all of the various functions discussed above in connection with FIG. 1. Device 300 may include any device or collection of devices capable of undertaking MIMO or MISO wireless communications in a network. For example, device 300 may include selected components of a wireless base station, a mobile platform such as a mobile computer, a wireless node, a sensor node of a sensor network, etc., although claimed subject matter is not limited in this regard.

Device 300 may include a node 302 having a processor 304, an RF transceiver 306 and multiple RF transmitters in the form of antennas 308. Node 302 may include additional items such as memory, a router, network interface logic, etc. that have not been shown in FIG. 3 for the sake of clarity. Processor 304 may further include processing logic 305 configured to provide the functionality described herein. However, claimed subject matter is not limited to specific types or manifestations of processing logic. For example, processor 304 may be a microprocessor or Central Processing Unit (CPU). In other implementations, processor 304 may be an Application Specific Integrated Circuit (ASIC), a Field Programmable Gate Array (FPGA), a digital signal processor (DSP), or other integrated formats. Further, antennas 308 may be any suitable antennas including but not limited to loop, dish, parabolic, panel, sector, directional, omnidirectional, etc. Also, while an RF transceiver 306 is illustrated in FIG. 3, claimed subject matter is not limited in this regard and node 302 may, for example, employ discrete RF receiver and RF transmitter circuitry. Further, processor 304 may receive an indication of one or more selected channels in the form of a signal 310 obtained via antennas 308 and transceiver 306.

Figure 4:
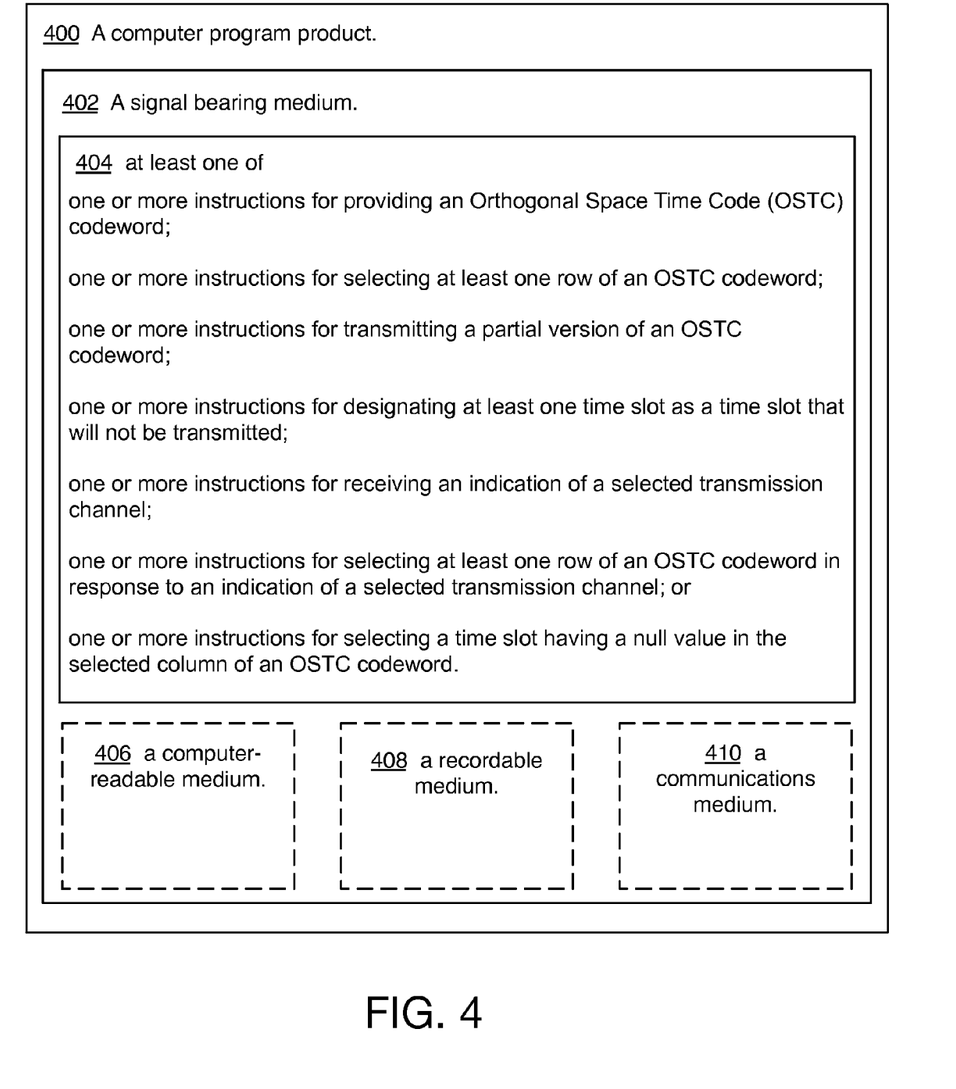
FIG. 4 illustrates an example computer program product.

FIG. 4 illustrates an example computer program product 400 that is arranged in accordance with the present disclosure. Program product 400 may include a signal bearing medium 402. Signal bearing medium 402 may include one or more instructions 404 that, when executed by, for example, a processor, may provide the functionality described above with respect to FIG. 1 and/or FIG. 3. Thus, for example, referring to the system of FIG. 3, processor 304 and/or logic 305 may undertake one or more of the blocks shown in FIG. 1 in response to instructions 404 conveyed by medium 402.

In some implementations, signal bearing medium 402 may encompass a computer-readable medium 406, such as, but not limited to, a hard disk drive, a Compact Disc (CD), a Digital Video Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, referring to the system of FIG. 3, program product 400 may be wirelessly conveyed to processor 304 by signal bearing medium 402, where signal bearing medium 402 is conveyed to device 300 by a wireless communications medium 410 (e.g., an wireless communications medium conforming with the 802.11 standard).

Figure 5:
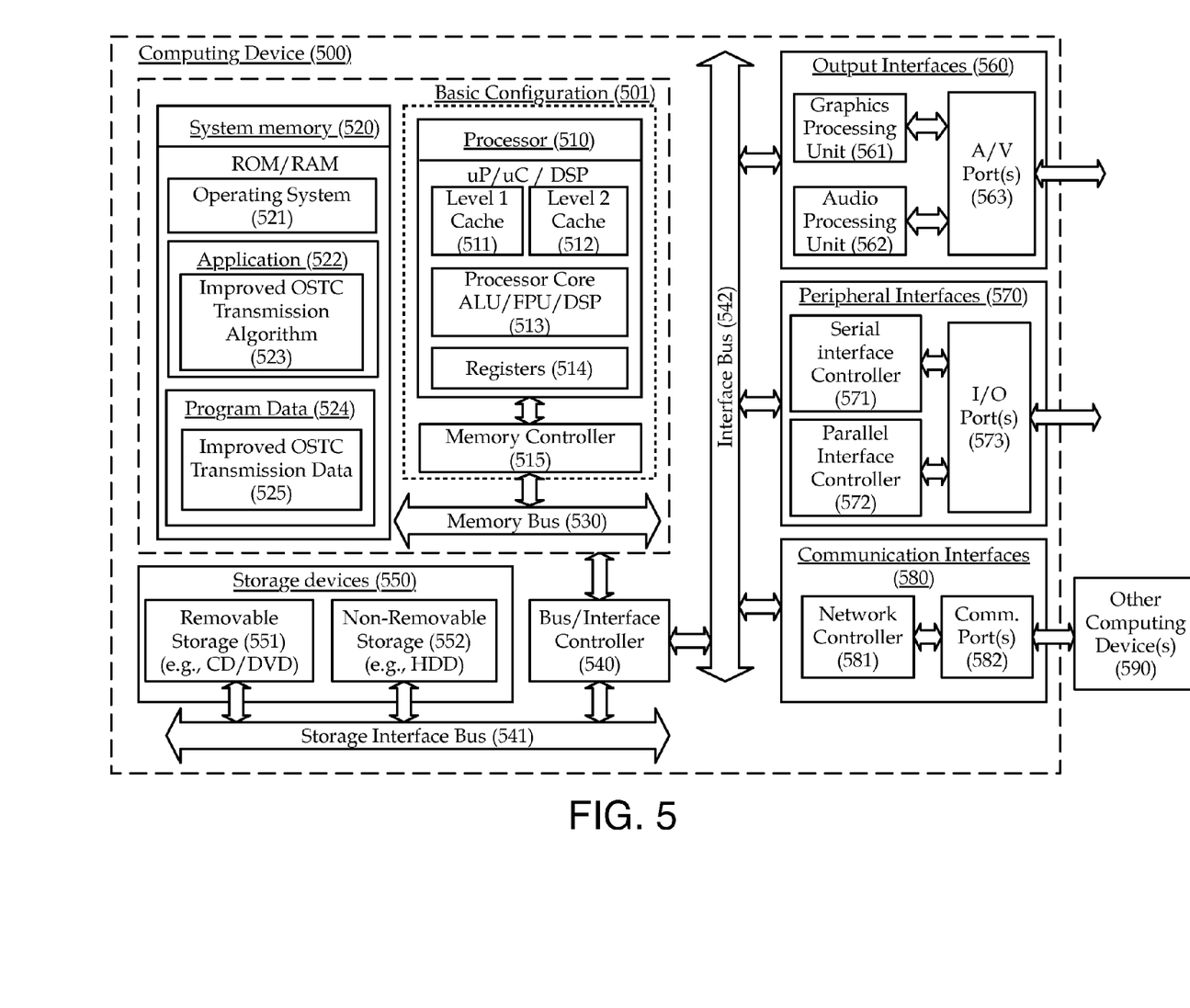
FIG. 5 is a block diagram illustrating an example computing device, all arranged in accordance with the present disclosure.

FIG. 5 is a block diagram illustrating an example computing device 500 that is arranged in accordance with the present disclosure. In one example configuration 501, computing device 500 may include one or more processors 510 and system memory 520. A memory bus 530 can be used for communicating between the processor 510 and the system memory 520.

Depending on the desired configuration, processor 510 may be of any type including but not limited to a microprocessor (μP), a microcontroller (μC), a digital signal processor (DSP), or any combination thereof. Processor 510 can include one or more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include an improved OSTC transmission algorithm 523 that is arranged to perform the functions as described herein including the functional blocks described with respect to process 100 of FIG. 1. Program Data 524 may include data 525 for use in improved OSTC transmission algorithm 523, for example, data corresponding to an indication of one or more selected channels. In some example embodiments, application 522 may be arranged to operate with program data 524 on an operating system 521 such that implementations of improved OSTC transmission may be provided as described herein. This described basic configuration is illustrated in FIG. 5 by those components within dashed line 501.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output interfaces 560 may include a graphics processing unit 561 and an audio processing unit 562, which may be configured to communicate to various external devices such as a display or speakers via one or more A/V ports 563. Example peripheral interfaces 560 may include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication interface 580 includes a network controller 581, which may be arranged to facilitate communications with one or more other computing devices 590 over a network communication via one or more communication ports 582. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 500 may also be implemented as a personal computer including both laptop computer and non-laptop computer configurations. In addition, computing device 500 may be implemented as part of a wireless base station or other wireless system or device such as node 302 described above with respect to FIG. 3.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed:

1. A method for wireless communication, comprising:
providing an Orthogonal Space Time Code (OSTC) codeword, the OSTC codeword comprising a plurality of rows of symbol values;
receiving an indication of a preferred transmission channel, the preferred transmission channel selected to have a stronger received signal and/or a larger signal to noise ratio;
selecting at least one row of the OSTC codeword, wherein the at least one row is selected based in part upon the indication of the preferred transmission channel and the symbol values of the OSTC codeword; and
transmitting a partial version of the OSTC codeword, wherein the partial version of the OSTC codeword excludes the selected row.

2. The method of claim 1, wherein each row of the OSTC codeword comprises a time slot, and wherein selecting at least one row of the OSTC codeword comprises designating at least one time slot as a time slot that will not be transmitted.

3. The method of claim 1, wherein the partial version of the OSTC codeword comprises rows of the OSTC codeword other than the selected row.

4. The method of claim 2, wherein transmitting a partial version of the OSTC codeword comprises not transmitting the selected row of the OSTC codeword.

5. The method of claim 4, wherein not transmitting the selected row of the OSTC codeword comprises never transmitting the selected row of the OSTC codeword.

6. The method of claim 1, wherein the plurality of rows of the OSTC codeword comprises a plurality of time slots, wherein the OSTC codeword also comprises a plurality of columns of data symbols, each column corresponding to a different transmission channel; and wherein receiving an indication of the preferred transmission channel comprises receiving an indication of a selected column of the OSTC codeword.

7. The method of claim 6, wherein selecting at least one row of the OSTC codeword comprises selecting a time slot having a null value in the selected column of the OSTC codeword.

8. The method of claim 1, wherein one or more of the symbol values of the selected at least one row of the OSTC codeword are null.

9. An article comprising: a computer program product comprising a non-transitory storage medium having stored therein instructions that, if executed, result in:
providing an Orthogonal Space Time Code (OSTC) codeword, the OSTC codeword comprising a plurality of rows of symbol values;
receiving an indication of a preferred transmission channel, the preferred transmission channel selected to have a stronger received signal and/or a larger signal to noise ratio;
selecting at least one row of the OSTC codeword, wherein the at least one row is selected based in part upon the indication of the preferred transmission channel and the symbol values of the OSTC codeword; and
transmitting a partial version of the OSTC codeword, wherein the partial version of the OSTC codeword excludes the selected row.

10. The article of claim 9, wherein each row of the OSTC codeword comprises a time slot, and wherein selecting at least one row of the OSTC codeword comprises designating at least one time slot as a time slot that will not be transmitted.

11. The article of claim 9, wherein the partial version of the OSTC codeword comprises rows of the OSTC codeword other than the selected row.

12. The article of claim 11, wherein transmitting a partial version of the OSTC codeword comprises not transmitting the selected row of the OSTC codeword.

13. The article of claim 12, wherein not transmitting the selected row of the OSTC codeword comprises never transmitting the selected row of the OSTC codeword.

14. The article of claim 9, wherein the plurality of rows of the OSTC codeword comprises a plurality of time slots, wherein the OSTC codeword also comprises a plurality of columns of data symbols, each column corresponding to a different transmission channel; and wherein receiving an indication of the preferred transmission channel comprises receiving an indication of a selected column of the OSTC codeword.

15. The article of claim 14, wherein selecting at least one row of the OSTC codeword comprises selecting a time slot having a null value in the selected column of the OSTC codeword.

16. The article of claim 9, wherein one or more of the symbol values of the selected at least one row of the OSTC codeword are null.

17. A wireless communications apparatus, comprising:
a plurality of radio frequency (RF) transmitters;
a wireless transceiver coupled to the plurality of RF transmitters; and
processing logic coupled to the wireless transceiver;
wherein the processing logic is configured to:
receiving an indication of a preferred transmission channel, the preferred transmission channel selected to have a stronger received signal and/or a larger signal to noise ratio;

select at least one row of an OSTC codeword, the OSTC codeword comprising a plurality of rows of symbol values, wherein the at least one row is selected based in part upon the indication of the preferred transmission channel and the symbol values of the OSTC codeword; and transmit only a partial version of the OSTC codeword using the plurality of RF transmitters, wherein the partial version of the OSTC codeword excludes the selected row.

18. The apparatus of claim 17, wherein the plurality of rows of the OSTC codeword specify data symbols to be transmitted, wherein the plurality of rows of the OSTC codeword comprise a plurality of time slots for transmitting the data symbols; and wherein transmitting a partial version of the OSTC codeword comprises not transmitting data symbols during a selected time slot of the plurality of time slots.

19. The apparatus of claim 18, wherein transmitting a partial version of the OSTC codeword comprises transmitting data symbols during time slots of the plurality of time slots other than the selected time slot.

20. The apparatus of claim 18, wherein the preferred transmission channel corresponds to a first RF transmitter of the plurality of RF transmitters, wherein the selected time slot comprises a time slot during which the OSTC codeword specifies a null value for the first RF transmitter.

21. The apparatus of claim 17, wherein the RF transmitters, wireless transceiver and processing logic comprise portions of a wireless base station.

22. The apparatus of claim 17, wherein one or more of the symbol values of the selected at least one row of the OSTC codeword are null.

23. A wireless communications system, comprising:
a computing device; and
a wireless node coupled to the computing device, wherein the wireless node is configured to:

receive an indication of a preferred transmission channel, the preferred transmission channel selected to have a stronger received signal and/or a larger signal to noise ratio;

select at least one row of an OSTC codeword, the OSTC codeword comprising a plurality of rows of symbol values, wherein the at least one row is selected based in part upon the indication of the preferred transmission channel and the symbol values of the OSTC codeword; and transmit only a partial version of the OSTC codeword, wherein the partial version of the OSTC codeword excludes the selected row.

24. The system of claim 23, wherein the plurality of rows of the OSTC codeword specify data symbols to be transmitted, wherein the plurality of rows of the OSTC codeword comprise a plurality of time slots for transmitting the data symbols; and wherein transmitting a partial version of the OSTC codeword comprises not transmitting data symbols during a selected time slot of the plurality of time slots.

25. The system of claim 24, wherein transmitting a partial version of the OSTC codeword comprises transmitting data symbols during time slots of the plurality of time slots other than the selected time slot.

26. The system of claim 24, wherein the wireless node comprises a plurality of RF transmitters, wherein the preferred transmission channel corresponding to a first RF transmitter of the plurality of RF transmitters, and wherein the selected time slot comprises a time slot during which the OSTC codeword specifies a null value for the first RF transmitter.

27. The system of claim 23, wherein the computing device and the wireless node comprise a wireless base station.

28. The system of claim 23, wherein one or more of the symbol values of the selected at least one row of the OSTC codeword are null.

* * * * *